United States Patent [19]

Moon

[11] 4,322,715
[45] Mar. 30, 1982

[54] AUTOMOTIVE LIGHT CIRCUIT

[76] Inventor: Charles G. Moon, 4325 Whitney Way, Erie, Pa. 16511

[21] Appl. No.: 156,669

[22] Filed: Jun. 5, 1980

[51] Int. Cl.³ .............................................. B60Q 1/26
[52] U.S. Cl. .................................... 340/81 R; 340/73; 340/74
[58] Field of Search ................... 340/81 R, 74, 66, 67, 340/69, 71, 73, 76; 315/83, 82, 77, 200 A; 307/10 LS

[56] References Cited

U.S. PATENT DOCUMENTS

| | | | |
|---|---|---|---|
| 2,863,096 | 12/1958 | Hollins | 315/83 |
| 3,040,207 | 6/1962 | Grontkowski | 315/77 |
| 3,206,723 | 9/1965 | Doane | 340/81 R |
| 3,535,680 | 10/1970 | Onksen | 340/81 R |
| 3,603,840 | 9/1971 | Du Rocher | 340/74 |

Primary Examiner—John W. Caldwell, Sr.
Assistant Examiner—Donnie L. Crosland

[57] ABSTRACT

A signal circuit for a vehicle having two front lights and two rear lights each having a single filament lamp. The light circuit provides a parking light circuit wherein each of the lights is illuminated with partial voltage, a brake light circuit wherein the two rear lamps are illuminated with full voltage, a flasher circuit in which all of the lamps are intermittently illuminated with partial voltage and a turn signal circuit in which one front lamp and one rear lamp at a time are illuminated with full voltage.

2 Claims, 3 Drawing Figures

4,322,715

AUTOMOTIVE LIGHT CIRCUIT

This is a substitute, for application Ser. No. 557,638 filed 3-21-75.

GENERAL STATEMENT OF INVENTION

The signal light equipment of present vehicles is well known and documented. It includes the front, rear, and side braking and identification lights. Also the front and rear turn signal lights for each direction and the brake lights at the rear of the vehicle. These are individually controlled by a multiplicity of switches including a complex turn signal switch and two turn signal pulsing switches. Because of this complexity when certain light bulb filaments burn out these may go undetected, creating a safety problem, and making it difficult to determine which bulb or current element is defective.

This invention relates to a system for energizing these various lights so that control is accomplished in a more simple and straight forward manner than at present. This invention is most appropriately applied to turn signal lights and other associated lights and signals of automobiles, and other similar vehicles.

The proposed system has the following advantages: (1) Single filaments bulbs and sockets in all locations where dual filament bulbs and sockets were previously used. This reduces cost and allows further design simplification of bulb and socket for further reduced cost and improved design; (2) Approximately one-half of the wiring to present dual filament bulbs is eliminated; (3) Much longer bulb life because the bulbs are used at less than full intensity for most of the time they are energized; (4) Maintenance will be simplified because of the simpler circuits and bulbs; (5) Contact duty is reduced on some switches because of the lower power level involved; (6) The turn signal switch is simplified; (7) Only one flasher unit is required; (8) The system can readily be adopted to provide a clearer indication of the driver's intent; hence, gives improved safety features.

Present circuits utilize bulbs with dual filaments—one filament for running lights and one for flashing turn signals or brake lights. Separate wires and circuits energize each filament for each function.

The proposed system combines several concepts which allow bulbs with only one filament to be used economically for more than one function. This also allows the use of one conductor to each light fixture instead of two, a considerable saving in wire. The particular lights effected are the parking lights, the tail lights, the front and rear turn signal lights, and the "brake on" indicating lights.

One of the important aspects of this invention is the interesting characteristics of an automotive type incandescent light bulb. As the voltage is decreased the current decreases. As the current decreases the resistance also decreases. At 50% volts the ohms and amps are approximately 70%. Thus, the watts are approximately 34%. But most important the lumens are even more sensitive to volts and at 50% volts are approximately 5-10%. This is illustrated by the following tabulation.

Typical automotive incandescent lamp (example 24 watts)

|  | Volts | Ohms | Amps | Watts | Lumens |
| --- | --- | --- | --- | --- | --- |
| Full voltage | 12 | 6.0 | 2.0 | 24 | 100% |
| ½ Voltage | 6 | 4.2 | 1.4 | 8.2 | 5% |
| Approximate % | 50 | 70 | 70 | 34 | 5% |

Above data based on tests and handbook information.

This in combination with the low wattage dissipated in the voltage dropping resistor required to produce these lower illumination levels make it practical to use this characteristic. The final requirement is to devise suitable circuits which use these concepts with less cost and complexity than present systems. This has been accomplished by the proposed circuits.

GENERAL DESCRIPTION OF THE DRAWINGS

DETAILED DESCRIPTION OF THE DRAWINGS

Figure 1:
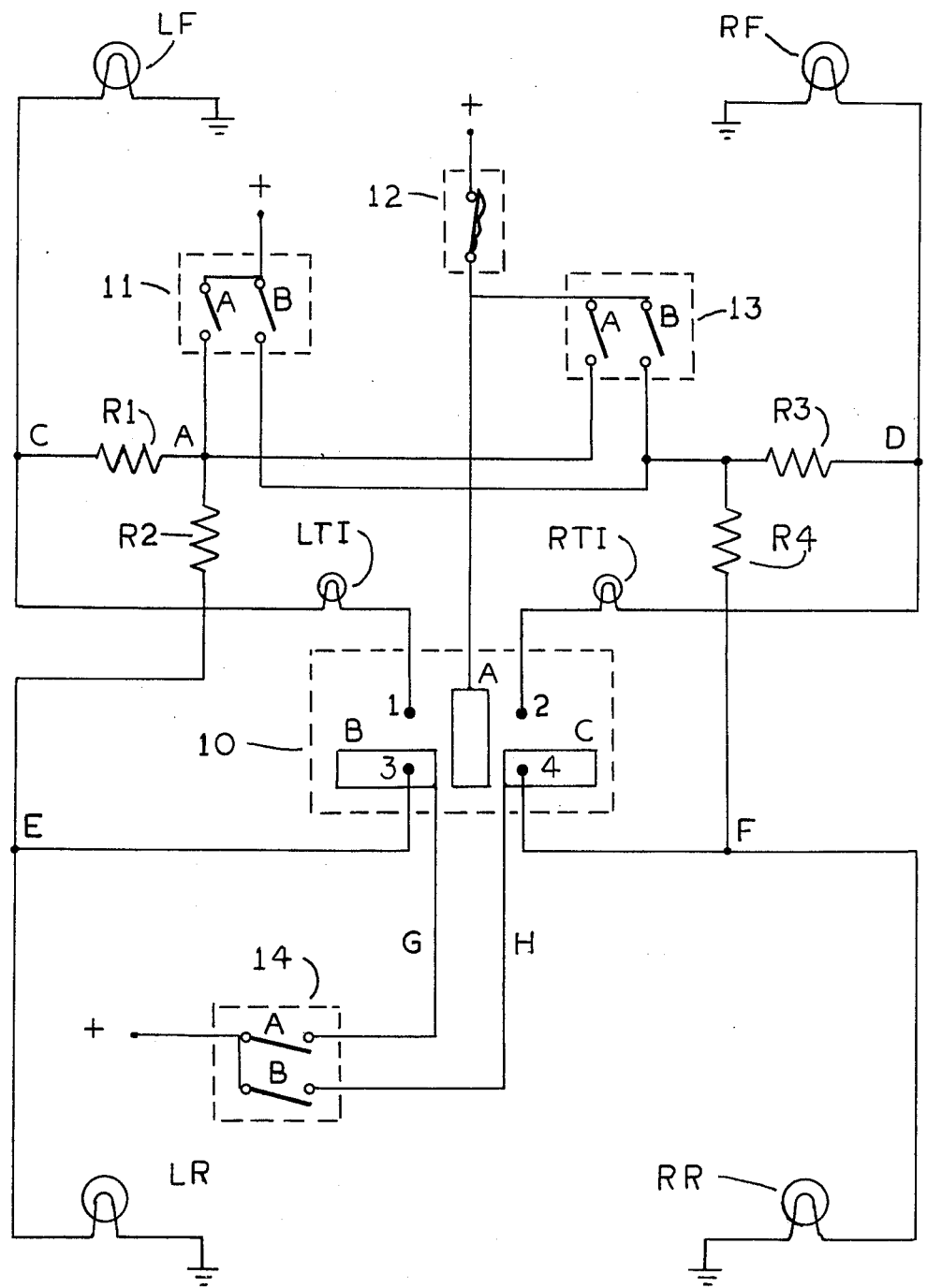
FIG. 1 is a schematic view of a brake control circuit according to the invention.

Now with more particular reference to the drawings, the embodiment of FIG. 1 shows a lighting circuit made up of left front lights LF, right front lights RF, left rear lights LR and right rear lights RR. Each of the lamps have a single filament or element bulb of the incandescent type familiar to those skilled in the art.

Functioning as a parking light, all lamp bulbs are energized by parking light switch 11 which with the contact A unit of the switch energizing wire junction A, then through voltage dropping resistors R1 and R2, wire junction points C and E which energize the left side front LF light and rear light LR respectively at reduced voltage. The percentage voltage in brilliance is optonal and is based on the relative brilliance desired in the parking lights as compared with the turn signal and braking lights. Usually the parking lights are less brilliant, 40% is a reasonable ratio. In a similar manner the B contact of the parking light switch energizes the right side vehicle lights RF and RR in the parking light mode through wire junction point B and the voltage dropping resistors R3 and R4.

When only the Turn Signal Switch operates, assume for a right turn, the sliding contact units A, B & C move toward the right. This connects the A contact unit with contact points 2 & 4. Contact point 2 feeds power through the Right Turn Indicating Light RTI and to wire junction point D which energizes the right front RF light at the sliding contact unit A. As the flasher Unit is connected to these light circuits it begins to pulse voltage to the circuits, causing flasher action. In a similar manner the right rear RR light is energized by sliding contact A energizing wire junction point 4. These are the only lights energized in this mode.

The turn indicating lights shown are intended as low resistance, low voltage drop bulbs. These could be conventional bulbs fed from two additional contact points on the Turn Signal Switch if desired.

When both the Parking Light Switch 11 and the Turn Signal Switch 10 are operated the combined result is similar to that produced by present circuit operation, with the left side parking lights on continuously at reduced voltage and the right side lights pulsing between reduced voltage (parking lght mode) and full voltage from the turn signal switch.

When the parking light switch and right turn flasher are both being operated, if the Brake Light Switch 14 is depressed contact A of the brake light switch feeds through wire G to contact unit B of the turn signal switch. This feeds contact 3 of the turn signal switch and energizes wire contant point E and the left rear bulb at full brilliance. The left front bulb remains at reduced brilliance.

If the Brake Light Switch 14 is energized and the Parking Light Switch is open, full voltage is applied at wire contact points E & F to give full brilliance to the rear bulbs. The voltage drop across both R1 and R2 resistors reduce the voltage on the left front light to a value that produces a negligible brilliance and similarly for the right front light.

Two additional switch units can be added to the Parking Light Switch 11 to avoid energizing the front lights when the Brake Light Switch 14 is energized with the Parking Light Switch 11 if desired off.

The Four Way Flasher Switch 13 through its contact unit A energizes circuit contact point A and through resistors R1 and R2 the left side lights. In a similar manner contact unit B energizes the right side lights. The power is pulsed through the Flasher unit 12. All bulbs are energized at reduced brilliance so that the total current in the Flasher Unit is approximately the same as that for a normal right or left turn with half of the bulbs energized at full brilliance.

There are many configurations and variations in using the basic principles of operation of the proposed circuit; however, the basic concepts are the same. Various trade-offs in number of switch elements and other circuit elements are possible. Variations in the precise mode of system operations are also possible depending on the choice of the user. However, again the basic concepts are the same.

A recommended variation is to include the front and rear side identification with the front and rear light circuits. Although these are not shown on the diagrams it is obvious that the left front side identification light should be energized with the left front light, and similarly for the other side lights.

Figure 2:
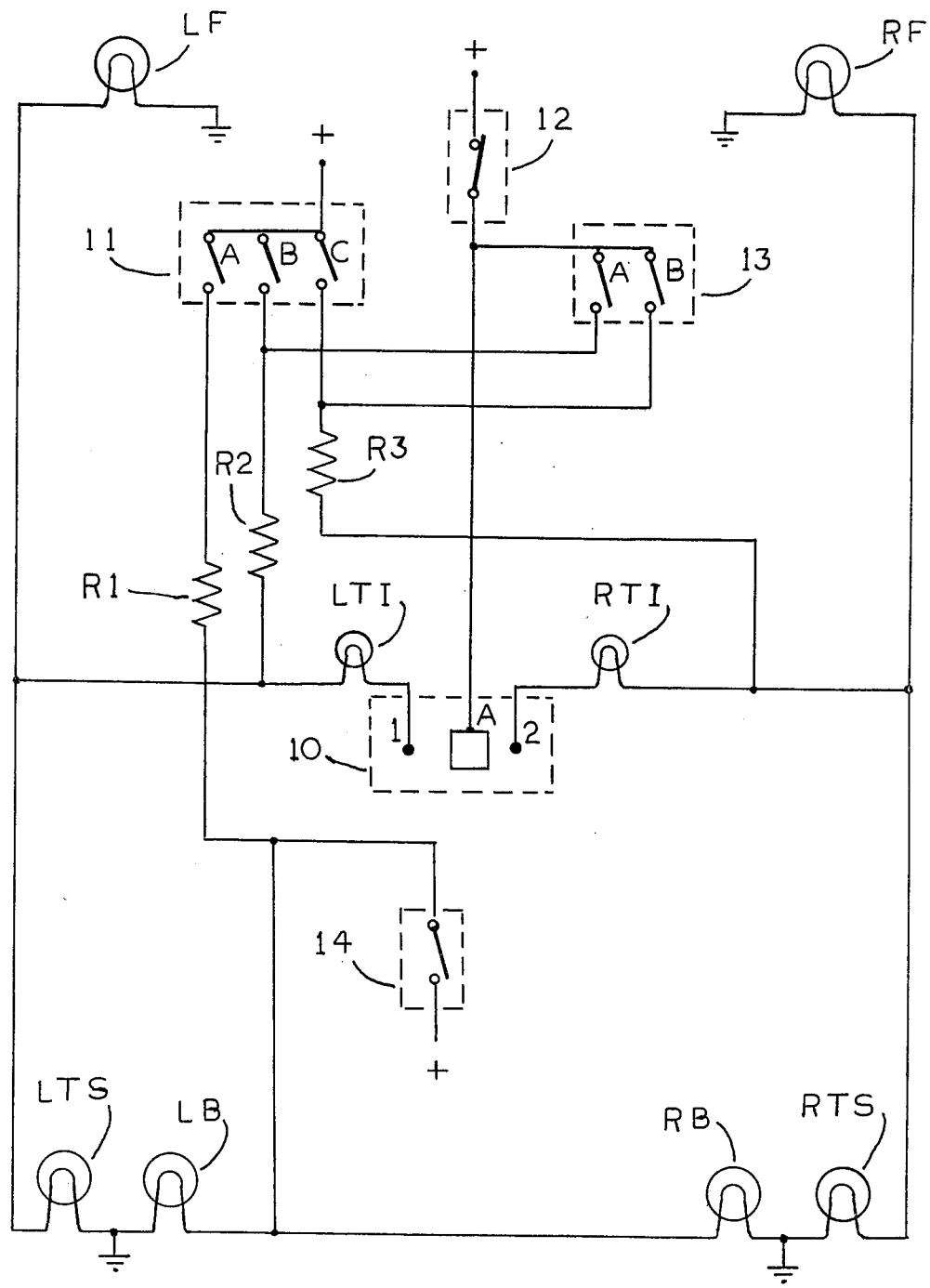
FIG. 2 is a schematic view of another embodiment of the invention.

The embodiment of the invention shown in FIG. 2 shows a typical variation with two tail lights on each side. These are the left turn signal, LTS and the left brake LB, right turn signal RTS and a right brake RB. Each of these lamps are illuminated at full brilliance as a signal light and at reduced brilliance as a parking light. Further simplifications in the system are gained at the expense of two additional lights, system operation is similar to FIG. 1 and corresponding parts are numbered in accordance with corresponding numbers in the embodiment of FIG. 1.

Figure 3:
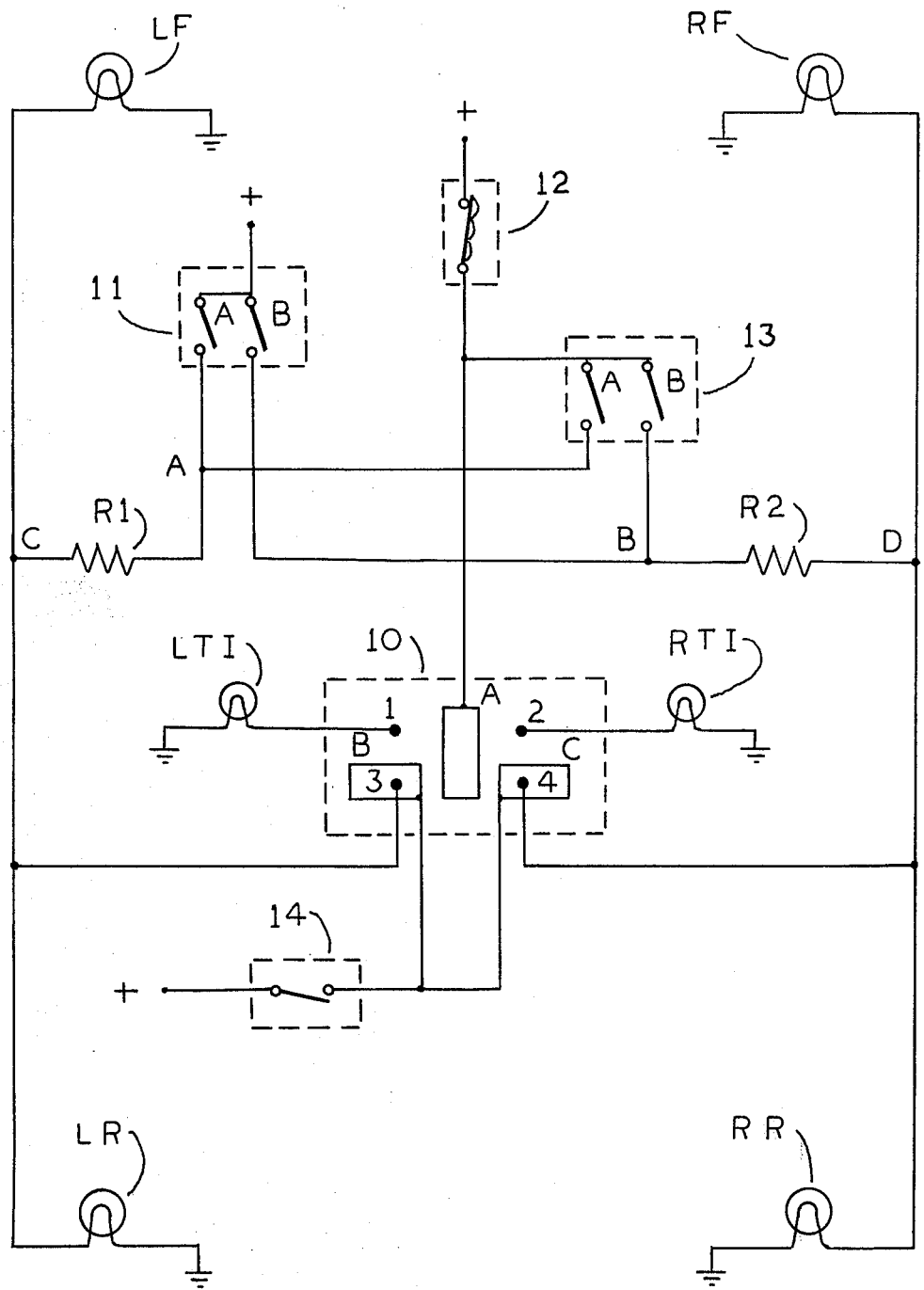
FIG. 3 is a schematic view of yet another embodiment of the invention.

In the embodiment of the invention shown in FIG. 3, another variation of the circuit according to the invention is shown which differs from the circuits shown in FIGS. 1 and 2, by the fact that all of the lights are illuminated to full brilliance when the brake light switch 14 is closed. This gives further safety by also showing at all sides and front of the vehicle that the brakes are being applied. When the turn signal switch is energized then all lights on that side of the vehicle will flash.

The use of single filament bulbs, each of which provides various signal functions, permits simpler circuits and bulb design specifications and lower cost, greater standardization and improved reflector design and cost. These are the major advantages of the proposed concept.

Because of the simpler circuits and the fact that each bulb has only one filament, maintenance and replacement of bulbs is simplified.

The turn signal switch has approximately one half of the contacts as compared with switches used in present circuits. Most present circuits use two flasher units because of circuit complexity.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a signal light circuit comprising,
   a first front lamp means,
   a second front lamp means,
   a first rear lamp means,
   a second rear lamp means,
   a source of voltage,
   a parking switch having two movable terminals connected to said source of voltage, and a first fixed terminal and a second fixed terminal,
   a turn signal switch having,
   a first fixed terminal, and
   a second fixed terminal,
   a flasher unit having one terminal connected to said source of voltage, and a second terminal,
   four-way flasher switch having a first fixed terminal and a second fixed terminal and two movable terminals connected to the second terminal of said flasher unit and to a movable terminal on a turn signal switch,
   a first resistor means,
   a second resistor means,
   said first resistor means having a first end connected to said first fixed terminal on said parking switch and to said first fixed terminal on said four-way flasher switch,
   said first resistor means having a second end connected to said first front lamp means and to a first fixed terminal on said turn signal switch and to said first rear lamp means,
   said second resistor means havng a first end connected to said second fixed terminal on said parking switch and to said second fixed terminal on said four-way flasher switch,
   said second resistor means having a second end connected to said second front light and to a second fixed terminal on said turn signal switch and to said second rear lamp means,
   said movable terminal on said turn signal switch being adapted to connect said flasher unit selectively to said first fixed terminal on said turn signal switch or to said second fixed terminal on said turn signal switch,
   said first resistor means comprises a first resistor member and second resistor member connected together at their first end, and to said first fixed terminal on said parking switch,
   said first resistor member being connected to said first front lamp, and said second resistor member having its second end connected to said first rear lamp, and said second resistor means comprising, a third resistor member and a fourth resistor member having a first end connected together, and to said second fixed terminal on said four-way flasher switch, said second end of said third resistor member being connected to said right front light and said fourth resistor member having its second end connected to said second light.

2. The circuit recited in claim 1 wherein said circuit includes a brake switch, said turn signal switch has a first movable terminal, a second movable terminal and a third movable terminal and wherein said brake switch has a first terminal connected to said source of power and a second terminal connected to said second movable terminal of said turn signal switch and said second fixed terminal of said brake switch being connected to said third fixed terminal of said turn signal switch.

* * * * *